Oct. 29, 1957     C. W. PORTER     2,811,679
MULTI-SEQUENCE WELD TIMER
Filed Sept. 16, 1954
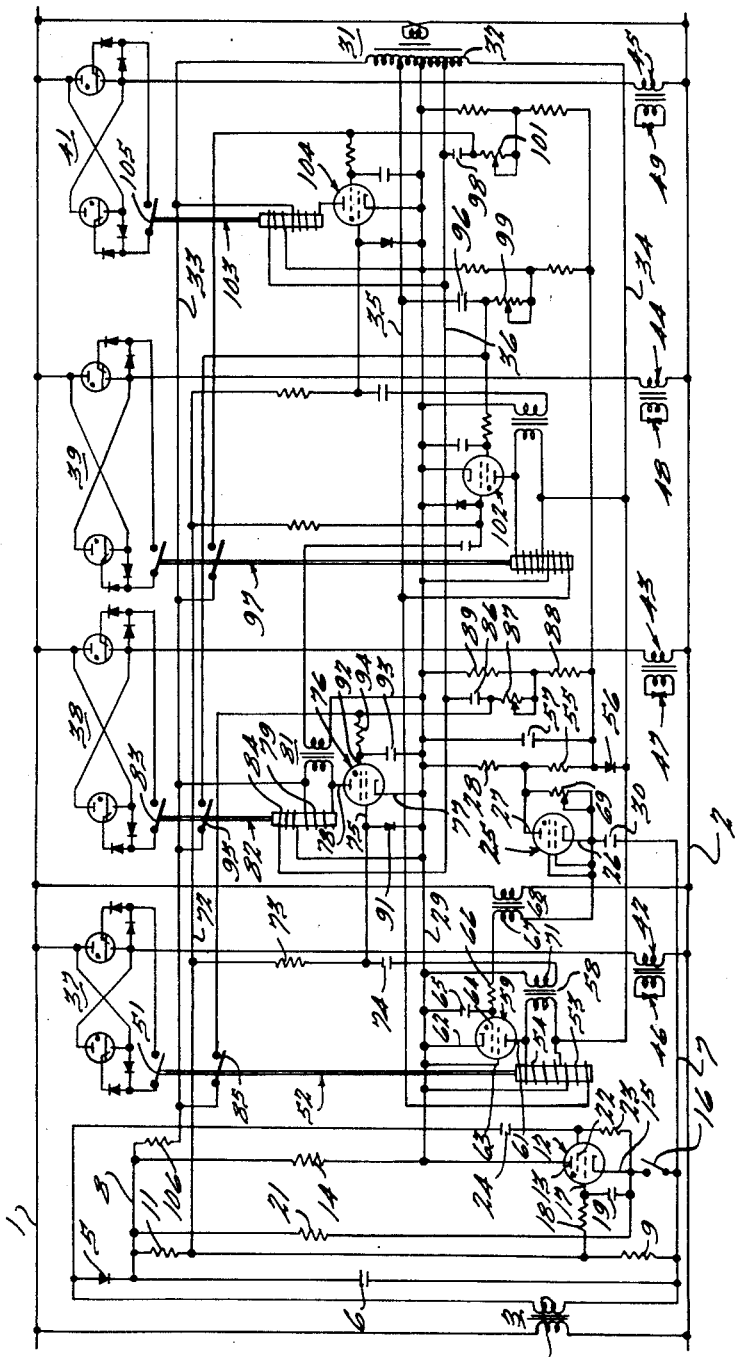
INVENTOR.
Clarence W. Porter
BY Myron J. Seibold
ATTORNEY United States Patent Office 2,811,679
Patented Oct. 29, 1957

2,811,679

MULTI-SEQUENCE WELD TIMER

Clarence W. Porter, Milwaukee, Wis., assignor to Square D Company, Detroit, Mich., a corporation of Michigan Application September 16, 1954, Serial No. 456,391

12 Claims. (Cl. 317—142)

This invention relates to an improved electric control circuit and more particularly to an electronic welder control circuit controlling a plurality of sequential welds.

The control circuit is specifically illustrated as showing a series of four welding periods as utilized in the dwell period of a press welder.

In the operation of press welders, it is desired that the overall operating period shall be made as short as possible to speed up the operating cycle. At the same time, the tendency is to apply a greater number of welding operations in the dwell period in which the machine remains ready for the passing of welding current and this requires that the period between successive welds in a sequence be made as short as possible.

It is therefore the object of the present invention to provide a control circuit for the supplying of multi-sequence welds providing for a minimum delay period between successive applications of welding current.

Another object of the invention is the provision of a control circuit for multi-sequence welds in accordance with the preceding object utilizing simple and reliable components providing for only half cycle delay between successive welds.

Another object of the invention is a control circuit in accordance with the preceding object which also provides for synchronous firing of ignitron contactors controlling the welds including the synchronous closing of controlling relays at a point on the line voltage wave to minimize starting transients.

Another object of the invention is a control circuit wherein sucessive electronic tubes control the firing of successive ignitron contactors with each tube coupled to the one following so as to fire the successive contactors with but a one-half cycle delay therebetween.

Other objects and features of the invention will be readily apparent to those skilled in the art from the specification and appended drawing illustrating certain preferred embodiments in which:

The figure is a diagrammatic representation of an improved electronic control circuit for multi-sequence welds incorporating the present invention.

In the figure there are disclosed a pair of main supply lines 1 and 2 normally connected to a source of alternating current which is not illustrated. Connected between these supply lines is the primary of a transformer 3 whose secondary winding 4 supplies a direct current controlling circuit through rectifier 5 and condenser 6. This direct current circuit is provided between the line 7, of reference or zero voltage, and the line 8 supplying a positive voltage. Between lines 7 and 8 is located a voltage divider circuit comprised by the serially connected resistors 9 and 11. A first electronic tube 12 has its anode 13 connected to the direct current line 8 through resistor 14 and its cathode 15 connected through an initiating switch 16 to the reference line 7. The control grid 17 of tube 12 is connected through a resistance 18 to the junction between the voltage dividing resistances 9 and 11 and to a timing and hold-off condenser 19, the opposite side of which connects to cathode 15 and through resistance 21 to the direct current line 8. The shield grid 22 of tube 12 is connected through resistance 23 to the cathode 15 and through condenser 24 to the secondary of winding 4 of transformer 3.

A second tube 25 has its control and shield grids connected to the cathode 26 and through condenser 30 to the reference line 7. The anode 27 of tube 25 is connected through resistance 28 to a line 29 which in turn connects through resistance 14 to the direct current line 8. A control transformer 31 has its primary connected across the lines 1 and 2 and its secondary 32 connected to two control lines 33 and 34. Low voltage taps on the secondary winding 32 feed to lines 35 and 36 as well as to center tap line 29.

The anode 27 is also connected through resistor 55 and rectifier 56 to line 34 and a condenser 57 parallels resistances 28 and 55.

A multiplicity of ignitron contactors and welding transformers, one in each step for the multi-sequence welding operation, are provided. The contactors are indicated at 37, 38 39 and 41, each being constituted by a pair of conventional back-to-back ignitrons which are connected in inverse parallel between supply lines 1 and 2 through the primaries of welder transformers 42, 43, 44, 45 respectively, whose secondary windings are individually connected to their individual welding electrodes indicated generally at 46, 47, 48, 49.

Conduction of the first ignitron contactor 37 is controlled by contacts 51 operating from a relay 52 having a pair of operating coils 53 and 54 thereon.

The operation of relays of the type of that indicated at 52 and to be further described hereinafter is disclosed and claimed in the copending application of Ernest G. Anger et al. Serial No. 363,468 filed June 23, 1954 for Welder Control.

In the operation of this relay, the energization of the main operating coil 54 is synchronized so that after a suitable time delay the contact 51 will close at a point on the supply voltage wave to provide a minimum transient in the weld. The coil 53 of the relay is connected across the low voltage lines 29 and 35 and will maintain the relay 52 closed during any half cycle following one in which the coil 54 is energized, thus preventing opening of the relay except when the coil 54 is deenergized during a normally conducting half cycle.

The main operating coil 54 of relay 52 is connected in parallel with a coupling transformer 58 between lines 34 and 29 through an electronic tube 59 whose anode 61 is connected to the operating coil and coupling transformer and whose cathode 62 connects to line 29, to which shield grid 63 is also connected. The control grid 64 of tube 59 connects through condenser 65 to line 29 and a resistor 66 connects the control grid 64 through the secondary winding 67 of transformer 68 to the cathode 26 of tube 25. A control rheostat 69 is adjustably connected to vary the discharge time of condenser 30 to control the duration of the first weld period. Coupling transformer 58 has its secondary winding 71 connected between line 29 and a control line 72 through resistance 73 and condenser 74, the midpoint therebetween being connected to the control grid 75 of an electronic tube 76.

Tube 76 controls the second weld period, having its cathode 77 connected to line 29 and its anode 78 connected to a second parallel circuit comprising a main operating coil 79 and the primary of a coupling transformer 81 for the next weld in the sequence. The operating coil 79 is provided for a relay 82 similar to the relay 52 and having contacts 83 controlling the conduction of the ignitron contactor 38 passing current through welding transformer 43. Relay 82 is provided with a holding coil 84 similar to the coil 53 of relay 52, the coil 84 being connected across the low voltage lines 29, 36.

Relay 52 is provided with a second pair of contacts 85 which control the charging of the weld time condenser for the second weld in the sequence, this being indicated at 86 and having its discharge time controlled by adjustment of the rheostat 87 connected to the midpoint between the voltage dividing resistances 88, 89. The control grid 75 of tube 76 is connected to the midpoint of transformer 31 at line 29 through a rectifier 91 and the shield grid 92 of tube 76 is connected through condenser 93 to line 29 and through resistance 94 to the condenser 86.

Relay 82 is provided with a second pair of contacts 95 which control the charging of the weld time condenser for the third welding time, this being indicated at 96 and it will be noted that the remaining elements in the welding sequence duplicate those provided for the second stage. In other words, the controls for contactors 39 and 41 are identical with that for contactor 38, relay 97 controlling the charging of the weld time condenser 98 for the fourth weld time, condensers 96 and 98 being timed out through their adjusting rheostats 99 and 101 respectively. It is noted that relay 97 for contactor 39 is controlled through the energization of tube 102 and relay 103 which controls the conduction of contactor 41 is controlled by tube 104. Relay 103, the last in the cycle, has but a single set of contacts 105 controlling only the ignitron contactor and has no coupling transformer in parallel with its main operating coil.

The operation of the multi-sequence timer of the invention is as follows:

With the initiating switch 16 open, tube 12 is nonconducting because its cathode circuit is open and its grid circuit is negative due to the charge on condenser 19, condenser 19 charging from the direct current supply 8 through resistances 21 and 18 to the junction of the voltage divider resistances 9 and 11.

At this time, tube 25 is conducting to charge condenser 30 by current flow from the direct current line 8 through resistances 14 and 28 and tube 25 to the reference line 7. Tube 59 does not conduct because of the negative grid voltage developed across resistance 28 by the secondary of transformer 31, rectifier 56 and condenser 57.

Tubes 76, 102 and 104 do not conduct since their cathodes are at the level of direct current line 8 and their control grids are held therebelow by the voltage dividers 9, 11. Shield grids of tubes 76, 102 and 104 are also negative because of the voltage developed by the secondary of transformer 31, rectifier 56 and condenser 57.

Closure of the initiating switch 16 completes the cathode circuit and applies plate voltage to tube 12 by tying the cathode to the reference bus 7. Conduction of tube 12 is, however, delayed about one cycle due to the decay of the charge on condenser 19. This delay is provided to prevent interruption of the first weld if the initiating contacts should bounce open after their first closure, it being particularly noted that the control circuit of this invention provides for interruption of the weld sequence at any time when the initiating switch 16 is opened. In the circuit of this invention, tube 12 shield grid 22 conducts on positive pulses from the secondary winding 4 of transformer 3 through condenser 24, one each cycle. The rest of the cycle tube 12 is biased off by the shield grid. Therefore, tube 12 can only fire at this one synchronous instant each cycle and thus effects synchronous initiation of the control operation. When tube 12 fires, it continues firing during the control operation since it is provided with a direct current plate voltage from the line 8.

Conduction of tube 12 drops its anode and the cathode of tube 59 from the voltage of the direct current line 8 to a much lower voltage represented by the drop through tube 12. Therefore, the charge on condenser 30 causes the control grid of tube 59 to become positive and this tube conducts on the succeeding half cycle of voltage on the secondary of transformer 31 to energize the main operating coil 54 of relay 52 and the coupling transformer 58. After a mechanical time lag preset in relay 52, contacts 51 close to fire ignitron contactor 37, conduction occurring at approximately the normal current zero of the welding transformer so that the welding current is initiated with a minimum of transient.

Tube 59 continues to conduct during the duration of the No. 1 weld time period, this period ending when capacitor 30 is discharged enough to make the control grid 64 of tube 59 negative to its cathode 62. Capacitor 30 discharges through rheostat 69, resistance 28 and tube 12. Relay 52 is deenergized with the cutoff of tube 59 and the No. 1 weld current stops flowing.

A low voltage signal from transformer 68 is superimposed on the timing voltage, phase shifted by resistance 66 and condenser 65 and fed to the grid 64 of tube 59. This synchronizing voltage allows only full half cycles of conduction of tube 59. When a thyratron, such as tube 59, is cut off by a grid timing signal which is slowly timing negative, the tube will normally conduct late in each cycle because the plate voltage is not maximum in the early portion of each half cycle. It is necessary to stop conduction of the last half cycle with a full conduction to control the dropout or contact break angle.

The auxiliary winding 53 not only holds in the relay 52 on the non-conducting half cycle of the tube 59, but insures synchronous dropout of the relay 52 to maintain lead-trail firing of the ignitron and insure the conduction of an even number of half cycles of welding current to prevent welding current transients.

During tube 59 conduction, pulses from the secondary winding 71 of transformer 58 charge condenser 74 through the control grid 75 of tube 76. The negative charge on condenser 74 prevents conduction of tube 76. When the lower contacts 85 of relay 52 close, the No. 2 weld time capacitor 86 is charged from the direct current line 8 through limiting resistor 106, not previously described, tube 12 and the secondary winding of transformer 31.

As tube 59 cuts off, the pulses from the secondary winding 71 of transformer 58 terminate and condenser 74 quickly recharges in the opposite sense through secondary winding 71, tube 12 and resistances 9 and 73 to provide a positive bias for grid 75 of tube 76. Tube 76 therefore conducts on succeeding positive half cycles of voltage from the secondary transformer 31 to energize the operating winding 79 of its relay 82 and its coupling transformer 81. The contacts 85 on the relay 52 open after the cutoff of tube 59 and prevent further charging of the No. 2 weld time condenser 86 which now begins to discharge through rheostat 87, resistance 89 and the secondary of transformer 31. This second weld time ends when capacitor 86 has discharged sufficiently to make the shield grid 92 of tube 76 negative to the cathode 77. The operation of relay 82 is the same as that previously described for relay 52, contacts 83 controlling the conduction of ignitron contactor 38 and contacts 95 controlling the charging of timing condenser 96 for the third weld time period.

Rectifier 91 prevents the control grid 75 from going more than a very few volts positive with respect to the cathode 77 and hence prevents it over-controlling the cutoff of the shield grid 92.

The tubes 102 and 104 control the operation of their respective relays 97 and 103 similar to the control of relay 82 by tube 76, the duration of the weld time and of conduction of the contactor 39 being controlled by the discharge of condenser 96 through the rheostat 99 to control the third weld time, and the fourth weld time being controlled by the discharge of condenser 98 through the rheostat 101. The control condensers 96 and 98 are charged in response to closing of the contacts of the preceding relay and it will be seen that in view of the duplication of the successive stages of the multi-sequence welding that any desired number may be utilized without material change in the circuit. Thus, relays 82 and 97 and their control tubes 76 and 102 may be multiplied to any desired number or may be restricted in number within the clear spirit of the invention.

As previously pointed out, opening of the initiating switch 16 at any time will terminate the various stages of the welding operation since the tube 12 will cease to conduct, its cathode being removed from the reference line 7. During the time that the initiating switch 16 is closed, tube 25 does not conduct since its plate voltage is either negative or zero. However, when initiating switch 16 opens at the end of the sequence in the normal operation of the press welder, tube 25 again conducts and the No. 1 weld time condenser 30 is again quickly recharged through the tube 25. Reclosure of the initiating switch thereafter will repeat the cycle above described.

While the invention has many features, as will be apparent from the objects and from the appended claims, one of the primary features of the invention is in the carrying out of a plurality of welds in a multi-sequence of operation with a minimum time period between the welds. According to this invention, only a half cycle delay between welds is necessary, which is the minimum for proper operation. Thus, relay 82 closes its contacts 83 in the second half cycle after relay 52 drops out. In view of the synchronized firing provided by the pulses from secondary winding 4 of transformer 3 and the inherent mechanical delays of the relays 52, 82, etc., pickup will occur at the synchronized point to secure minimum transient, that is at normal current zero. This pickup will, however, occur in the second half cycle after the preceding relay has dropped out so that current will fail to flow through a weld for only one complete half cycle and passage of current through the succeeding ignitron contactor will occur in the second half cycle and at the synchronized point.

While certain preferred embodiments of the invention have been specifically disclosed, it is understood that the invention is not limited thereto, as many variations will be readily apparent to those skilled in the art and the invention is to be given its broadest possible interpretation within the terms of the following claims:

What is claimed is:

1. In a control circuit for effecting a plurality of sequential load current operations, a first electronic control tube having an anode cathode circuit and a control element, means connected to said control element for initiating anode cathode conduction of said first electronic tube, a first relay, a first pair of contacts on said first relay for controlling a load current operation, means for energizing said first relay by conduction of said anode cathode circuit of said first electronic tube, a first timing circuit including means for determining the duration of conduction of said first electronic tube, a second timing circuit, means including a second set of contacts on said first relay for energizing said second timing circuit, a second electronic tube having an anode cathode circuit and a control element, means coupling said first and second electronic tubes and energized by said conduction of said first electronic tube for normally preventing conduction of said second electronic tube, and means in said coupling means conditioned by termination of said conduction of said first electronic tube for conditioning said second electronic tube for conduction, and a relay energized by conduction of said anode cathode circuit of said second electronic tube and having a pair of contacts for controlling a second load current operation.

2. In a control circuit for effecting a plurality of sequential load current operations, a first electronic tube having an anode cathode circuit and a control element, means connected to said control element for effecting anode cathode conduction of said first electronic tube at a synchronized point on an alternating current supply wave, a first relay, means for energizing said first relay by said anode cathode conduction of said first electronic tube, a first set of contacts on said relay, said contacts being closed with a predetermined time delay to effect a load current operation at a synchronized point, a timing circuit including means for terminating said conduction of said first electronic tube, a second set of contacts on said relay, a second timing circuit including means for energizing said circuit by closing of said second set of contacts, a second electronic tube having an anode cathode circuit and a control element, coupling means interconnecting said first and second electronic tubes and including means for preventing anode cathode conduction of said second electronic tube while said first electronic tube is conductive, a second relay, circuit means connected to said control element for initiating conduction of said second electronic tube after termination of conduction of said first electronic tube and at a synchronized point on the supply wave to initiate energization of said second relay, a set of contacts on said second relay, said last mentioned contacts being closed a predetermined time delay after energization of the relay to synchronize the performance of a second load current operation, and circuit means for timing out said second timing circuit when said second set of contacts on said first relay opens to thereafter terminate conduction of said second electronic tube and terminate the second load current operation.

3. In a control circuit for effecting a plurality of sequential load current operations, a first electronic tube having an anode cathode circuit and a control element, means connected to said control element for initiating anode cathode conduction of said first electronic tube at a synchronized point on an alternating current supply wave, a first relay having a control winding, means for energizing said first relay by said conduction of said first electronic tube through said control winding, a first set of contacts on said relay, said contacts being closed with a predetermined time delay to effect a load current operation at a synchronized point, a timing circuit including means for terminating conduction of said first electronic tube, a second control winding on said relay and means for energizing said second winding to prevent dropout thereof for a full half cycle after termination of conduction of said first electronic tube, a second set of contacts on said relay, a second timing means and circuit means for energizing said second timing means by closing of said second set of contacts, a second electronic tube having an anode cathode circuit and a control element, coupling means interconnecting said first and second electronic tubes and including means for preventing anode cathode conduction of said second electronic tube while said first electronic tube is conductive a second relay having a control winding, circuit means connected to said control element for initiating conduction of said second electronic tube after termination of conduction of said first electronic tube and at a synchronized point on the supply wave to initiate energization of said second relay control winding, a set of contacts on said second relay, said last mentioned contacts being closed with a predetermined time delay after energization of said second relay to synchronize the performance of a second load current operation, and circuit means for timing out said second timing circuit when said second set of contacts on said first relay opens to thereafter terminate said conduction of said second electronic tube and said second load current operation, and a second control winding on said second relay and means for energizing said second winding to ensure dropout of said relay after an even number of half cycles of load current therethrough.

4. In a control circuit for effecting a plurality of sequential load current operations, a first electronic tube having an anode cathode circuit and a control element, means connected to said control element for initiating anode cathode conduction of said first electronic tube at a synchronized point on a supply wave, a first relay having a control winding, means for energizing said first relay by said conduction of said first electronic tube, a first set of contacts on said relay, said contacts being closed with a predetermined time delay to effect a load current operation at a synchronized point on the supply wave, said contacts closing in the first half cycle after the half cycle which initiates said conduction of said first electronic tube, a timing circuit including means for determining the duration of said conduction of said first electronic tube and terminating said conduction thereof at the end of a full half cycle, said relay being timed to drop out said set of contacts a fully cycle after cessation of said conduction of said first electronic tube, a second electronic tube having an anode cathode circuit and a control element, means connected to the control element of said second electronic tube for initiating anode cathode conduction of said second electronic tube in the next half cycle after dropout of said contacts of said first relay, a second relay, means for energizing said second relay by said anode cathode conduction of said second electronic tube, a set of contacts on said second relay, said contacts being closed a predetermined time delay after the energization of said second relay and in the half cycle following said conduction of said second electronic tube, and a second timing circuit and means for activating said circuit upon dropout of said first relay for determining the conduction period of said second electronic tube.

5. In a control circuit for effecting a plurality of sequential load current operation, a first electronic tube having an anode cathode circuit and a control element, means connected to said control element for initiating anode cathode conduction of said first electronic tube at a synchronized point on a supply wave, a first relay having a control winding, means for energizing said first relay by said conduction of said first electronic tube, a first set of contacts on said relay, said contacts being closed a predetermined time delay after energization of said relay to initiate a load current operation at a synchronized point on the supply wave, said contacts closing in the first half cycle after the half cycle which initiates said conduction of said first electronic tube, a timing circuit including means for determining the duration of conduction of said first electronic tube and terminating conduction thereof at the end of a full half cycle, said relay being timed to drop out said set of contacts a full cycle after cessation of said conduction of said first electronic tube, a second electronic tube having an anode cathode circuit and a control element, means connected to said control element of said second electronic tube for initiating anode cathode conduction thereof in the next half cycle after dropout of the contacts of said first relay, a second relay, means for energizing said second relay by said anode cathode conduction of said second electronic tube, a set of contacts on said second relay, said contacts being closed a predetermined time delay after the energization of said second relay and in the half cycle following conduction of said second electronic tube, a second set of contacts on said first relay, a second timing circuit for said second electronic tube, and circuit means for energizing said second timing circuit upon closure of said second set of contacts on said first relay, and means for initiating the timing out of said second timing circuit when said second set of contacts open.

6. In a control circuit for effecting a plurality of sequential load current operations, a first electronic tube having an anode cathode circuit and a control element, means connected to said control element for initiating anode cathode conduction of said first electronic tube, a first relay having a main operating coil, means for energizing said main operating coil upon said conduction of said first electronic tube, a first set of contacts on said first relay for effecting a load current operation, a timing circuit including means for controlling the duration of said conduction of said first electronic tube, a second electronic tube having an anode cathode circuit and a control element, a timing circuit for said second electronic tube, a second set of contacts on said first relay, circuit means for energizing said second timing circuit through said second set of contacts when closed and for activating said second timing circuit when opened thereafter, a second relay, means for energizing said second relay by conduction of said second electronic tube, a set of contacts on said second relay for performing a second load current operation, a coupling transformer, means for energizing said transformer in response to said conduction of said first electronic tube, and means energized by pulses from said coupling transformer for preventing conduction of said second electronic tube while said first electronic tube is conducting.

7. In a control circuit for effecting a plurality of sequential load current operations, a first electronic tube having an anode cathode circuit and a control element, means connected to said control element for initiating conduction of said first electronic tube, a first relay having a main operating coil, means for energizing said first relay in response to conduction of said first electronic tube, a first set of contacts on said first relay for effecting a load current operation, a timing circuit including means for controlling the duration of conduction of said first electronic tube, a second electronic tube having an anode cathode circuit and a control element, a timing circuit for said second electronic tube, a second set of contacts on said first relay and circuit means for energizing said second timing circuit through said second contacts when closed and for activating said second timing circuit when opened thereafter, a second relay, means for energizing said second relay by conduction of said second electronic tube, a set of contacts on said second relay for performing a second load current operation, a coupling transformer, circuit means for energizing said transformer in response to conduction of said first electronic tube, a condenser, means for charging said condenser by pulses from said coupling transformer and applying a control bias to said second electronic tube to prevent conduction thereof, said condenser being recharged in the half cycle following cessation of conduction of said first electronic tube to effect conduction of said second electronic tube thereafter.

8. In a control center for effecting a plurality of load current operations, a first electronic tube having an anode cathode circuit and a control element, means supplying a direct current source for said first electronic tube, an initiating switch for connecting said first electronic tube to said direct current source to effect conduction thereof for the duration of the sequence of load operations, a second electronic control tube having an anode cathode circuit and a control element, circuit means connected to the control element of said second electronic tube for initiating anode cathode conduction thereof in response to firing of said first electronic tube, a first relay, means for energizing said first relay in response to anode cathode conduction of said second electronic tube, a first set of contacts on said first relay and means for controlling a first load current operation in response to closure of said first set of contacts, a first timing circuit including means for determining the duration of conduction of said second electronic tube, a second timing circuit, a second set of contacts on said first relay and means for energizing said second timing circuit in response to closure of said second set of contacts, a third electronic tube having an anode cathode circuit and a control element, coupling means interconnecting said second and third electronic tubes including means energized by said anode cathode conduction of said second electronic tube for preventing anode cathode conduction of said third electronic tube, means for deenergizing said coupling means upon termination of conduction of said second electronic tube and for initiating anode cathode conduction of said third electronic tube, means for activating said second timing circuit in response to opening of said second set of contacts on said first relay, a second relay, and means for energizing said second relay in response to anode cathode conduction of said third electronic tube, said second relay having contacts for controlling a second load current operation.

9. In a control circuit for effecting a plurality of sequential load current operations, a first electronic tube having an anode cathode circuit and control elements, means supplying a direct current source for said first electronic tube, an initiating switch for connecting said anode cathode circuit of said first electronic tube to said direct current source to effect anode cathode conduction thereof and for maintaining said conduction for the duration of the sequence of load current operations, a second electronic tube having an anode cathode circuit and control element, means supplying an alternating current source to said anode cathode circuit of said second electronic tube, means connected to a control element of said first electronic tube for initiating anode cathode conduction thereof at a synchronized point on said alternating current supply, means connected to said control element of said second electronic tube for initiating anode cathode conduction of said second electronic tube in response to firing of said first electronic tube, a first relay, means energizing said first relay by anode cathode conduction of said second electronic tube, a first set of contacts on said first relay for controlling a load current operation, a coupling transformer, means energizing said transformed by anode cathode conduction of said second electronic tube, a first timing circuit including means for timing out as said second electronic tube conducts to effect termination of conduction thereof, a second timing circuit, a second set of contacts on said first relay and means for energizing said second timing circuit in response to closure of said second set of contacts, a third electronic tube having an anode cathode circuit and a control element, and means including said coupling transformer for preventing anode cathode conduction of said third electronic tube while said second electronic tube is conducting, means connected to said control element of said third electronic tube and energized in response to the conduction condition of said second electronic tube and initiating anode cathode conduction of said third electronic tube a predetermined interval after cessation of conduction of said third electronic tube, a second relay, means for energizing said relay in response to said anode cathode conduction of said third electronic tube, a set of contacts on said second relay and means for performing a load current operation in response to closure thereof, and means for activating said second timing circuit upon opening of said second set of contacts of said first relay to determine the period of said conduction of said third electronic tube.

10. In a control circuit for effecting a plurality of load current operations, a first electronic tube having an anode cathode circuit and control elements, means supplying a direct current source for said first electronic tube, an initiating switch for connecting said anode cathode circuit to said direct current source to effect anode cathode conduction thereof for duration of the sequence of load current operations, a second electronic tube having an anode cathode circuit and a control element, means supplying an alternating current source to said anode cathode circuit of said second electronic tube, means connected to a control element of said first electronic tube for initiating anode cathode conduction thereof at a synchronized point on said alternating current supply, means connected to said control element of said second electronic tube for initiating anode cathode conduction thereof in response to said conduction of said first electronic tube, a first relay having a control winding, means for energizing said control winding in response to said conduction of said second electronic tube, a first set of contacts on said first relay, said contacts closing with a predetermined time delay after energization of said control winding to effect a load current operation at a synchronized point, a second control winding on said first relay, and means for energizing said second control winding by said alternating current source to prevent dropout of said relay for a half cycle after termination of conduction of said second electronic tube so as to ensure passage of an even number of half cycles of load current, a timing circuit including means for terminating conduction of said second electronic tube, a second set of contacts on said relay, a second timing circuit and means for energizing said second timing circuit by closing of said second set of contacts, a third electronic tube having an anode cathode circuit and a control element, means supplying an alternating current source to said anode cathode circuit of said third electronic tube, means coupling said third electronic tube to said second electronic tube and including means for preventing anode cathode conduction of said third electronic tube while said second electronic tube is conductive, a second relay means connected to said control element of said third electronic tube for initiating anode cathode conduction thereof at a synchronized point on said alternating current supply, means for energizing said second relay in response to said conduction of said third electronic tube, a set of contacts on said second relay, said contacts closing with a predetermined time interval after energization of said relay to synchronize the performance of a second load current operation, said second timing circuit being actuated to time out conduction of said third electronic tube and said second load current operation in response to opening of said second contacts on said first relay, and a second control winding on said second relay and energized by said alternating current source for ensuring dropout of said relay after an even number of half cycles of load current.

11. In a control circuit for effecting a plurality of load current operations, a first electronic tube having an anode cathode circuit and control elements, means supplying a direct current source for said electronic tube, an initiating switch for connecting said anode cathode circuit to said direct current source to effect anode cathode conduction thereof for the duration of the sequence of load current operations, means connected to a control element of said first electronic tube for delaying firing of said tube for a predetermined interval, and means connected to another control element and including an alternating current wave for initiating firing of said first electronic tube at a synchronized point on said alternating current wave, a second electronic tube having an anode cathode circuit and a control element, means connected to said control element of said second electronic tube for initiating anode cathode conduction thereof in response to firing of said first electronic tube, a first relay, means for energizing said first relay by anode cathode conduction of said second electronic tube, a set of contacts on said relay, said contacts being closed in response to said anode cathode condution of said second tube a predetermined time interval after energization thereof to initiate a load current operation at a synchronized point on said alternating current supply wave, said relay contacts closing in the first half cycle after the half cycle which initiates conduction of said second electronic tube, a timing circuit connected to said second electronic tube and including means for determining the duration of conduction of said second electronic tube and terminating conduction thereof at the end of a full half cycle, means operative upon said relay and including said alternating current wave for timing said relay to drop out said contacts a full cycle after cessation of conduction of said second electronic tube, a third electronic tube having an anode cathode circuti and a control element, means for initiating anode cathode conduction of said third electronic tube in the next full cycle after opening of said contacts of said first relay, a second relay, means for energizing said second relay by said anode cathode conduction of said third electronic tube, said second relay having a set of contacts closing a predetermined time interval after the energization of said second relay and in the half cycle following said conduction of said third electronic tube, a second set of contacts on said first relay, a timing circuit for said third electronic tube, and means for energizing said last mentioned timing circuit upon closure of said second set of contacts of said first relay and including means for activating the timing out of said second timing circuit when said second set of contacts of said first relay are opened.

12. In a control circuit for effecting a plurality of sequential load current operations, a first electronic tube having an anode cathode circuit and control elements, means supplying a direct current source for said anode cathode circuit of said first electronic tube, an initiating switch for connecting said first electronic tube to said direct current source to effect conduction thereof for the duration of a load current sequence, means connected to a control element of said first electronic tube for delaying anode cathode conduction thereof after closing of said initiating switch for a predetermined time interval, a second electronic control tube having an anode cathode circuit and a control element, means connected to said control element of said second electronic tube for initiating anode cathode conduction thereof in response to conduction of said first electronic tube, a first relay, means for energizing said relay by said conduction of said second electronic tube, a first set of contacts on said relay and means for controlling a load current operation through said contacts, a first timing circuit including means for determining the duration of conduction of said second electronic tube, a second timing circuit, a second set of contacts on said relay, means for energizing said second timing circuit through said second set of contacts, a third electronic tube having an anode cathode circuit and a control element, circuit means for coupling said third electronic tube to said second electronic tube, said coupling means being energized by said conduction of said second electronic tube and operating to prevent anode cathode conduction of said third electronic tube during conduction of said second electronic tube, means for initiating anode cathode conduction of said third electronic tube upon deenergization of said coupling means, circuit means for activating said second timing circuit when the second set of contacts on said first relay is opened, a second relay, means for energizing said second relay by said conduction of said third electronic tube, and contacts on said second relay for controlling a second load current operation.

References Cited in the file of this patent

UNITED STATES PATENTS

| | | |
|---|---|---|
| 2,422,020 | Kingsmill | June 10, 1947 |
| 2,532,111 | Longini | Nov. 28, 1950 |
| 2,552,137 | Bivens | May 8, 1951 |
| 2,570,448 | Holmes | Oct. 9, 1951 |
| 2,635,165 | Spice et al. | Apr. 14, 1953 |
| 2,639,361 | Hartwig et al. | May 19, 1953 |
| 2,688,847 | Harness et al. | Sept. 14, 1954 |

OTHER REFERENCES

"Review of Scientific Inst.," Nov. 1939 pages 323–324.
"Electronics," July 1950, pages 70–73.